United States Patent [19]

Chaussade et al.

[11] Patent Number: 5,677,065
[45] Date of Patent: Oct. 14, 1997

[54] TRANSPARENT SUBSTRATE FITTED WITH A STACK OF SILVER LAYERS, WITH APPLICATION TO HEATED LAMINATED WINDOWS

[75] Inventors: Pierre Chaussade; Francoise Rigal, both of Sully Sur Loire, France

[73] Assignee: Saint Gobain Vitrage, Courbevoie, France

[21] Appl. No.: 548,132

[22] Filed: Oct. 25, 1995

[30] Foreign Application Priority Data

Oct. 25, 1994 [FR] France .................................. 94 12748

[51] Int. Cl.$^6$ .................................................. B32B 9/00
[52] U.S. Cl. ........................ 428/432; 428/31; 428/34; 428/212; 428/213; 428/220; 428/426; 428/433; 428/434; 428/458; 428/469; 428/699; 428/704; 296/39.3; 296/97.1; 296/97.2; 52/171; 52/304; 52/788
[58] Field of Search .................. 428/31, 432, 434, 428/469, 437, 699, 34, 213, 212, 220, 426, 701, 433, 698, 458, 704; 52/788, 171, 304; 296/39.3, 97.1, 97.2

[56] References Cited

U.S. PATENT DOCUMENTS

| | | | |
|---|---|---|---|
| 3,889,026 | 6/1975 | Groth | 428/34 |
| 4,965,121 | 10/1990 | Young et al. | 428/213 |
| 5,271,994 | 12/1993 | Termath | 428/216 |
| 5,306,547 | 4/1994 | Hood et al. | 428/213 |

*Primary Examiner*—Patrick Ryan
*Assistant Examiner*—Abraham Bahta
*Attorney, Agent, or Firm*—Oblon, Spivak, McClelland, Maier & Neustadt, P.C.

[57] ABSTRACT

A transparent substrate (1), comprising a support having thereon thin multiple layers comprising two layers of silver (3,5) alternating with three dielectric layers (2,4,6), the silver layer (3) closest to the substrate being thinner than the other silver layer (5), wherein the material of the dielectric layers is zinc sulfide.

15 Claims, 1 Drawing Sheet

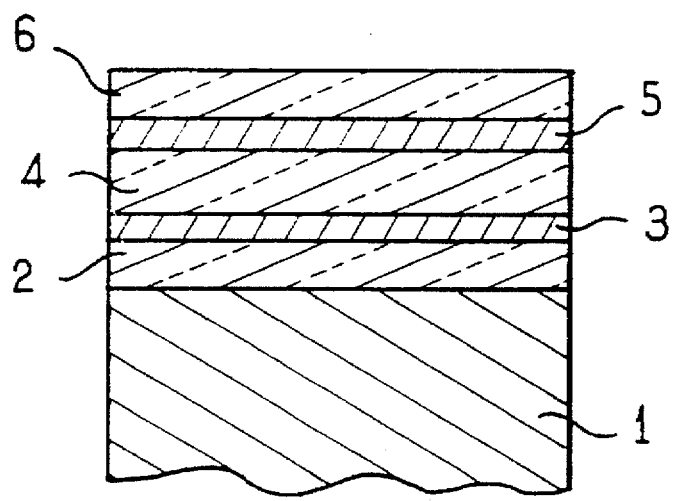
FIG_1
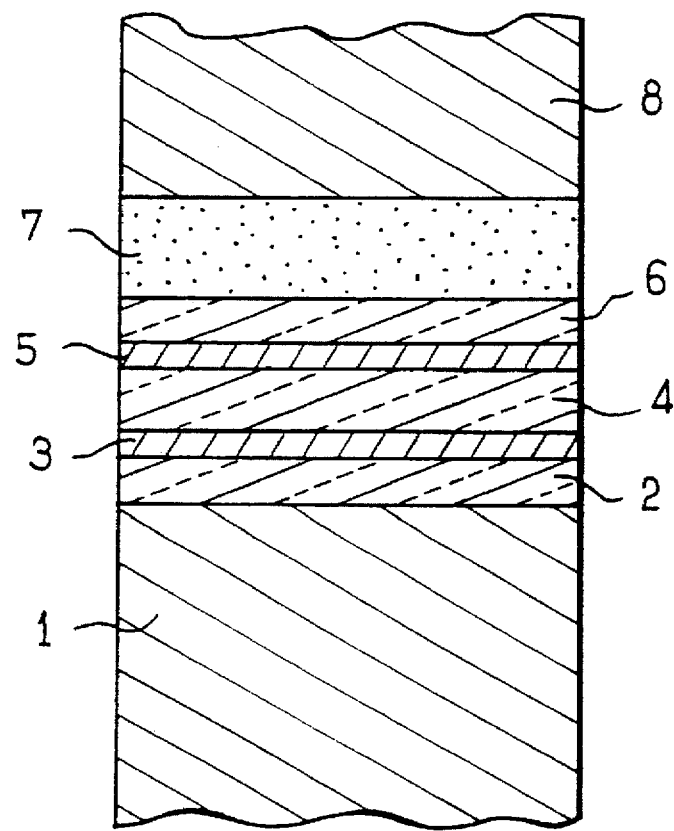
FIG_2

5,677,065

TRANSPARENT SUBSTRATE FITTED WITH A STACK OF SILVER LAYERS, WITH APPLICATION TO HEATED LAMINATED WINDOWS

BACKGROUND OF THE INVENTION

1. Field of the Invention

The invention relates to transparent substrates covered with multiple thin layers of silver and dielectric layers.

2. Discussion of the Background

Substrates of the type described above are used primarily to make insulating windows or laminated windows in which the functions are reinforced thermal insulation, solar protection, heating by the Joule effect in the layer or electromagnetic protection.

The optical performances of the substrates differ according to the various areas of application of the substrates. In particular, light transmission is normally average in the case of solar protection, while it is desirable for light transmission to be at a maximum in the case of a vehicle windshield, for example. It is to vehicle windshields that the substrate of the invention pertains.

In general, substrates having multiple layers comprised of layers of silver exhibit good infrared reflection performance, which contributes to solar protection and to low emissivity, and therefore useful in thermal insulation. Moreover, such substrates exhibit increased electrical conductivity. A common problem with such sets of multiple layers, which include layers of silver, is to achieve good performance for the preceding criteria with increased light transmission. In the case of heated windshields for passenger cars and for railroad, military and aviation vehicles in particular, it is often desired for substrates to have an electrical resistance per square unit of less than 5 ohms with greatly increased light transmission, greater than 75%, for example, with illuminant A in the case of a passenger car.

It is well known that gold can be used as a metal to provide good performance of substrates for uses on windshields. A thin layer of gold is placed between two dielectric layers of bismuth oxide or titanium oxide, for example. The layers of gold provide good electrical conduction, but they are not neutral in the transmission of light as they are in the reflection of light. The color of these substrates in transmission is greenish yellow and they exhibit strong and highly colored reflection in which the color will depend on the thicknesses of the dielectric layers that are used. But whatever these values are, reflection is never neutral.

A primary objective of the present invention is to fabricate substrates having layers formed by means of thermal evaporation techniques under vacuum which are less expensive than layers of gold, but which offer better performance in the visible domain, i.e., for colors during transmission and reflection in particular, without the other performance characteristics related to infrared reflection being inferior to those of the layer of gold.

A laminated window which is used in passenger vehicles is described in patent application WO 90/02653. The most "exterior" glass substrate, with respect to the vehicle passenger compartment, is provided with a stack of five layers on its internal side in contact with the intermediate layer made of thermoplastic material. This stack consists of two layers of silver inserted between three layers of zinc oxide, the layer of silver closest to the external substrate, which supports the stack having a thickness slightly greater than that of the second layer of silver.

Laminated windows of the type above are used as windshields, which explains why they have light transmission values $T_L$ on the order of 70% in order to comply with the safety standards in effect in the United States. In one embodiment, a value of 75% has been achieved. The deposition technique which is disclosed is reactive cathodic spraying. By using this technique it is possible to deposit the recommended dielectric layers which are all oxides. However, included among the latter, are several oxides which are refractory or not very stable oxides, with several possible states of oxidation which makes them nearly unfit for the vacuum evaporation technique.

In the application EP-A-0 031,278, an interferential optical filter is proposed which offers protection against infrared rays in which the transmission band is located in the visible range and centered at the greatest sensitivity of the eye, including a support which is at least partially transparent in said band on one side of which an optical filter is deposited and in which the filter consists of n filter elements, each of which includes one layer of metal placed between two layers of a transparent dielectric material that has a high index of refraction, n being a whole number greater than or equal to 3. It is also proposed that the metal layer be made of silver and the dielectric layer be made of zinc sulfide. However, because the thickness of the metal is greater than 20 nm and the number of its layers is at least 3, light transmission through the filter is particularly low.

EP-A-0 433,136 also discloses thin surface layers which enhance attachment of a set of layers to the thermoplastic intermediate sheet of a laminated window, which in particular are titanium, nickel-chromium or tantalum or an oxide of these metals.

In European patent application No. 94-401 846.4, a transparent substrate is disclosed, particularly one made of glass, with thin multiple layers on which one successively deposits:

- a first coating of dielectric material,
- a first layer with reflection properties in the infrared, especially metal-based layers,
- a second coating of dielectric material,
- a second layer with infrared reflection properties, especially a metal-based layer,
- a third coating of dielectric material, the substrate having a thickness of the first layer with reflection properties in the infrared which corresponds to approximately 55 to 75%, and preferably 60 to 70%, and especially about 65% of that of the second layer with reflection properties in the infrared.

In the European application, the layers with reflection properties in the infrared are made of silver and the dielectric layers are made with oxides, especially those obtained by cathode sputtering. This application, moreover, does not attempt in particular to obtain a conducting layer. A need, therefore, continues to exist for a transparent substrate of improved light reflection and transmission characteristics and heat insulation properties.

SUMMARY OF THE INVENTION

Accordingly, one object of the invention is to provide a light transmissive substrate having multi-layers of silver and dielectrics on a support.

Another object of the invention is to provide a passenger car window of improved light transmission properties based on the multi-layer substrate of the present invention.

Briefly, this object and other objects of the present invention, as hereinafter will become more readily apparent, can be attained by a transparent substrate comprising a substrate having thereon thin multiple layers comprising two layers of silver alternating with three dielectric layers, the silver layer closest to the substrate being thinner than the other silver layer, wherein the material of the dielectric layers is zinc sulfide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows the transparent substrate having multiple layers thereon of the present invention; and FIG. 2 shows a laminated window formed by bonding the substrate of the present invention with another transparent substrate through an intervening thermoplastic film.

DETAILED DESCRIPTION OF THE PREFERRED EMBODIMENTS

The present invention is a transparent substrate, especially one made of glass, having thin multiple layers including two layers of silver alternating with three layers of dielectric material, the silver layer closest to the substrate being thinner than the other silver layer and in which the dielectric layers are made from zinc sulfide. Preferably, the thickness of the intermediate dielectric layer is greater than or equal to 1.1 times the sum of the thicknesses of the two other dielectric layers, and the thicknesses of the first dielectric layer and of the third dielectric layer are approximately the same. They are, in particular, on the order of 28 nm.

Another embodiment of the invention is that the substrate of the invention includes on its surface a layer made of one of the metals of Groups IV, V or VII, of one of their alloys, or of an oxide of the same metals or alloys, in particular one made from titanium.

The substrate, with its layers, can be assembled with a second transparent substrate by means of a thermoplastic film and then, preferably, it includes a surface layer made of one of the metals of Groups IV, V or VII, of one of their alloys, or of an oxide of the same metals or alloys. Thus, for example, the surface layer is based on titanium and/or a titanium oxide.

The layers of the invention are deposited by a thermal evaporation technique in a vacuum. The substrate of the invention is specified in order to make a passenger car window and a heated window in particular.

In the present invention, in order to coat a substrate such as a sheet of glass, flat or rounded, with the various layers, the following procedure can be employed:

An enclosure with a vacuum is prepared in which thermal evaporation can be carried out, which is to say that at least one heating crucible is available.

The crucible for the deposition of silver, just as that for the zinc sulfide, is comprised of one sheet of folded molybdenum to comprise a regular shape which is called a "crucible-cube." The crucible for titanium or other metals of the external layers is a tungsten wire coil. The three crucibles are located 440 mm from the substrate. The latter is a sheet of glass 2 mm thick with dimensions 400 by 1200 mm, and the sheet is inserted horizontally above the crucible. The sheet is driven by a rapid movement in its plane so that it allows uniform deposition.

Control of the steps of evaporation is achieved by the intermediary of a photometer which is provided with a 550 nm filter, which conforms to the transmission value in situ during the process.

First, the evaporation process requires a step of preheating the crucible, as well as a stage for preparing the surfaces (glow discharge).

The process includes the following stages:
lowering the vacuum to $5 \cdot 10^{-5}$ bar
The crucibles which have been loaded with titanium, zinc sulfide and silver respectively are then pre-heated:
pre-heating the crucibles:
Ti 120 volts for 3 minutes
ZnS 100 volts for 3 minutes
Ag 50 volts for 3 minutes
glow discharge at $2.5 \cdot 10^{-5}$ mbar at 5 amperes for 10 minutes (the argon flow rate is subsequently adjusted)
evaporation at $2.5 \cdot 10^{-5}$ mbar under the following conditions
Ti 320 volts
ZnS 215 volts
Ag 230 volts A solution to the problems of color during reflection and increasing the antisolar function of a layer based on silver consists of conducting two depositions of silver instead of one.

The system of layers selected is therefore: Ti, ZnS, Ag, ZnS, Ag, ZnS, Ti.

FIG. 1 shows the substrate of the invention with titanium layers not being shown. The transparent substrate (1) can be seen. The first layer 2 of ZnS is shown and the second and third layers 4 and 6 of identical dielectric are shown. Layers 3 and 5 are layers of silver.

The under-layer and the over-layer of titanium are very thin and, as the evolution of their transmission shows, they are transformed rapidly into oxides. They constitute "attachment" layers which allow adherence of the zinc sulfide to the substrate and, in the laminated assembly, of the thermoplastic sheet to the same zinc sulfide.

Tests have been carried out to replace titanium with other metals of Group IV (Sn) and of Group V (Bi, Nb, Ta), as well as those of Group VIII (Ni) which have also yielded good results.

Controlling transmissions of the sample at the wavelength of 550 nm permits cessation of evaporation at the desired moment.

In order, therefore, to optimize light transmission $T_L$ and energy transmission $T_E$, transmissions $T_{550}$ to the following values must be limited:

1. Ti: 97%
2. ZnS: 82%
3. Ag: 73%
4. ZnS: 79%
5. Ag: 73%
6. ZnS: 79%
7. Ti: 74%

Such a layer has been evaluated. The thicknesses of its components are given in reference to FIG. 1:

ZnS layer 2: 28 nm
Ag layer 3: 10 nm
ZnS layer 4: 62 nm
AG layer 5: 12 nm
ZnS layer 6: 28 nm The under-layers and over-layers of titanium had a thickness of approximately 1 nm.

The substrate described above was assembled according to the conventional method with an identical substrate sheet 8, the substrate (8) being bonded to the multilayer substrate (1) through intervening polyvinyl butyryl (PVB) 7, as shown in FIG. 2.

It was on this laminated sample that the optical and electrical performances were measured, the layer being on the internal side of the first glass.

The results are the following:

Light transmission, illuminant A, $T_L=75\%$

Solar energy transmission $T_E=43\%$

Glass layer side reflection $R_L=7\%$

Energy reflection $R_E=28\%$

Resistance per square unit $R_O=3.6$ ohms.

The results are barely different from those of a gold layer except for reflections which are much weaker in this case, which is quite interesting for applications in passenger cars. In addition, visible transmission and reflection are much less colored (purity on the order of 1% compared to 20% for gold during transmission).

The resulting product therefore offers a very satisfactory solution to the problem of an efficient layer with a very large $T_L/T_E$ ratio and therefore is favorable for good performance with respect to solar protection in passenger cars in particular. In addition, the large $T_L/R_O$ ratio permits great efficiency in a heating window, especially in passenger car windows. These performances are obtained with traditional methods of production which utilize thermal evaporation and with reduced material costs (absence of gold).

Having now fully described the invention, it will be apparent to one of ordinary skill in the art that many changes and modifications can be made thereto without departing from the spirit or scope of the invention as set forth herein.

What is claimed as new and is desired to be secured by Letters Patent of the United States is:

1. A transparent substrate, comprising: a support (1) having thereon thin multiple layers comprising two layers of silver (3,5) alternating with three dielectric layers (2,4,6), the silver layer (3) being thinner than the other silver layer (5), wherein the material of the dielectric layers is zinc sulfide.

2. The substrate of claim 1, wherein said support is made of glass.

3. The substrate according to claim 1, wherein the thickness of the intermediate dielectric layer (4) is greater than or equal to 1.1 times the sum of the thicknesses of the other two dielectric layers (2,6).

4. The substrate according to claim 3, wherein the thicknesses of the first layer of dielectric (2) and of the third layer of dielectric (6) are approximately equal.

5. The substrate according to claim 4, wherein the approximately equal thicknesses of the first and third dielectric coatings are on the order of 28 nm.

6. The substrate according to claim 1, wherein the support on one surface thereof has a layer made of one of the metals of Group IV, V or VIII, of one of their alloys, or of an oxide of the same metals or alloys.

7. The substrate according to claim 6, wherein said metal is titanium.

8. The substrate according to claim 1, wherein it is assembled with a second transparent substrate (8) by means of a thermoplastic film (7).

9. The substrate according to claim 8, wherein it includes a surface layer made of one of the metals of Group IV, V or VIII, of one of their alloys, or of an oxide of the same metals or alloys.

10. The substrate according to claim 9, wherein the surface layer is based on titanium and/or an oxide of titanium.

11. The substrate according to claim 1, wherein the layers are deposited by a thermal evaporation technique in a vacuum.

12. A passenger car window, comprising:

a laminate of the substrate of claim 1 with a second transparent substrate bonded together with an intermediate thermoplastic film.

13. The passenger car window of claim 12, wherein said thermoplastic film is a PVB film.

14. The substrate according to claim 1, wherein the ratio of the thicknesses of Ag layer (3) to Ag layer (5) is about 0.8.

15. A transparent substrate, comprising:

a support (1) coated on each side with a metal, metal oxide, alloy or alloy oxide of metal(s) selected from Groups IV, V and VIII of the Periodic Table, said support having thereon thin multiple layers comprising two layers of silver (3,5) alternating with three dielectric layers (2,4,6), the silver layer (3) being thinner than silver layer (5), wherein the material of the dielectric layers is zinc sulfide.

* * * * *